United States Patent Office.

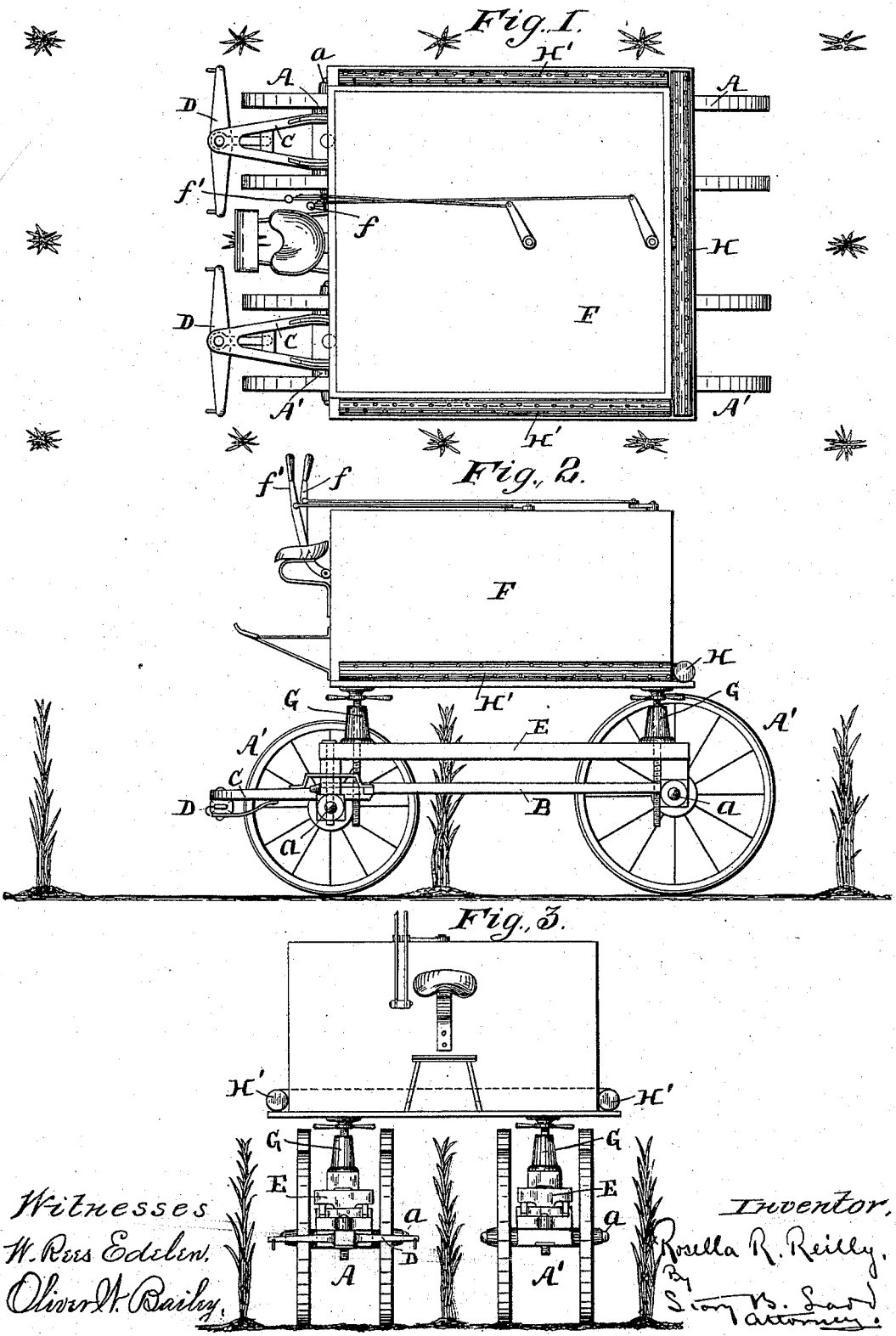

ROSELLA REBECCA REILLY, OF NEWHOUSE, MINNESOTA.

WATERING-CART.

SPECIFICATION forming part of Letters Patent No. 575,375, dated January 19, 1897.

Application filed March 21, 1895. Serial No. 542,630. (No model.)

*To all whom it may concern:*

Be it known that I, ROSELLA REBECCA REILLY, a citizen of the United States, residing at Newhouse, in the county of Houston and State of Minnesota, have invented certain new and useful Improvements in Watering-Carts; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of the present invention is to provide a machine for sprinkling or watering growing crops during dry seasons or in rainless districts, whereby crops can be saved which otherwise would be lost or greatly injured by a protracted drought. It is especially designed for corn, but it is applicable to farm-crops generally that are planted in rows or hills, and also to the watering of pasture, and in case of a prairie-fire it can be used to stop the spread thereof.

The invention consists of the machine hereinafter described and claimed.

In the accompanying drawings, Figure 1 is a plan view of the machine. Fig. 2 is a side elevation with the outer wheels removed, and Fig. 3 is a front view.

In all three figures the machine is illustrated as standing in operative position in a corn-field.

A A and A' A' are two sets of truck-wheels carried by short axles $a$, the width of the trucks being narrow enough to allow them to pass easily through between rows of corn. Each truck has its reach B, hounds C, and singletree D, and firmly fastened to the front and rear bolsters of each truck there is a strong plank E, which carries the water-tank F. The tank is supported on the planks E E of the two trucks by means of four jack-screws G, one under each of the four corners of the tank, there being two of these jack-screws on each truck, placed at or near the ends of the planks E. By means of these jack-screws the water-tank can be elevated to any height the corn requires.

Extending across the rear of the tank at its base there is a sprinkling-pipe H, and there are similar ones H' H' along each side of the tank. These sprinklers have the proper pipe connections with valves, and they may form a single sprinkler extending around the tank, with a single valve to control the flow of water thereto, or the side sprinklers may be independent of the rear sprinkler, and also independent of each other. In the present case two valve-operating levers $f f'$ are shown, it being assumed, for the purpose of illustration, that the valve-operating lever $f$ controls the discharge from the rear sprinkler H and the valve-lever $f'$ that of the two side sprinklers H'.

When the machine is employed for sprinkling corn, it stands with the trucks between the rows, with one row under the tank, as clearly shown. The rear sprinkler H then sprinkles not only the middle row of corn under the cart, but the row on each side, in all three rows, while the side sprinklers throw their water over the row immediately beneath them and onto the two next rows. Thus on each trip across a field seven rows are sprinkled, three with the rear sprinkler and two with each of the side sprinklers.

The machine takes two horses, one to each truck.

What I claim is—

1. In a cart for sprinkling corn, the combination of the trucks, the planks connecting the trucks, a water-tank, the jack-screws at the ends of each plank to support the tank and adjust it in height, the rear pipes and the side pipes, as set forth.

2. In a cart for sprinkling corn, the combination of the trucks, the planks connecting the trucks, a water-tank, the jack-screws at the ends of each plank to support the tank and adjust it in height, the rear pipe and the side pipes, the pipe-valves and the valve-levers, all substantially as set forth.

In testimony whereof I affix my signature in presence of two witnesses.

ROSELLA REBECCA REILLY.

Witnesses:
O. K. DAHLE,
C. S. TRASK.